(12) United States Patent
Guo et al.

(10) Patent No.: US 9,736,824 B2
(45) Date of Patent: Aug. 15, 2017

(54) METHOD, BASE STATION, AND TERMINAL FOR FEEDING BACK CHANNEL STATE INFORMATION

(71) Applicant: ZTE Corporation, Shenzhen (CN)

(72) Inventors: Senbao Guo, Shenzhen (CN); Yunfeng Sun, Shenzhen (CN); Yu Ngok Li, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/403,608

(22) PCT Filed: May 10, 2013

(86) PCT No.: PCT/CN2013/075470
§ 371 (c)(1),
(2) Date: Nov. 25, 2014

(87) PCT Pub. No.: WO2014/019394
PCT Pub. Date: Feb. 6, 2014

(65) Prior Publication Data
US 2015/0139101 A1    May 21, 2015

(30) Foreign Application Priority Data
Jul. 31, 2012   (CN) .......................... 2012 1 0268958

(51) Int. Cl.
*H04W 72/04*      (2009.01)
*H04L 5/00*       (2006.01)
*H04W 72/10*      (2009.01)

(52) U.S. Cl.
CPC ....... *H04W 72/0413* (2013.01); *H04L 5/0035* (2013.01); *H04L 5/0053* (2013.01); *H04L 5/0073* (2013.01); *H04W 72/10* (2013.01)

(58) Field of Classification Search
None
See application file for complete search history.

(56) References Cited

U.S. PATENT DOCUMENTS

2014/0044083 A1* 2/2014 Kim ........................ H04L 5/001
370/329

FOREIGN PATENT DOCUMENTS

| CN | 102065560 X | 5/2011 |
|----|-------------|--------|
| CN | 102237958 A | 11/2011 |
| CN | 102315910 A | 1/2012 |
| CN | 102594527 X | 7/2012 |

OTHER PUBLICATIONS

3GPP TSG-RAN WG1 #69, R1-122628. Prague, Czech, May 21-25, 2012, Intel Corporation, Periodic and asperiodic CSI feedback modes for DL CoMP, Agenda item 7.5.1.4, document for discussion and decision, 4 pages.
3GPP TSG RAN WG1 Meeting #69, R1-122294, Prague, Czech Republic, May 21-25, 2012, Agenda item 7.5.1.4, LG Electronics, Consideration on CoMP CSI feedback modes, document for discussion and decision, 4 pages.
3GPP TSG RAN WG1 Meeting #69, R1-122930, Prague, Czech Republic, May 21-25, 2012, Agenda item 7.5.1.4, Fujitsu, Email discussion969-10): Details of collision handling and compression/multiplexing in case of 2 or more CSIs being configured in the same reporting instance of CoMP CSI feedback, document for discussion and decision, 30 pages.
3GPP TSG RAN WG1 Meeting #69, R1-122077, Prague, Czech Republic, May 21-25, 2012, Agenda item 7.5.1.4, Fujitsu, Discussion on CSI feedback modes for CoMP transmission, document for discussion and decision, 4 pages.
International Search Report of PCT/CN2013/075470, dated Aug. 15, 2013.

* cited by examiner

*Primary Examiner* — Kouroush Mohebbi
(74) *Attorney, Agent, or Firm* — Banner & Witcoff, Ltd.

(57) ABSTRACT

A method for feeding back channel state information is provided, which includes: a base station notifying a terminal of transmission resources used for transmitting a plurality of Channel State Information (CSIs) or a plurality of colliding CSIs and/or of priorities between a plurality of CSIs or a plurality of colliding CSIs. In the present document, the base station indicates the terminal on how to handle a feedback of the colliding CSIs when collision between the CSIs occurs during processes of feeding back a plurality of CSIs via a high layer signaling or a preset rule, which enables the base station and the terminal to reach a uniform feedback mechanism, and guarantees a minimum possibility of discarding CSIs, thereby solving the problem of the impact on the CoMP performance due to discarding excessive CSIs.

13 Claims, No Drawings

METHOD, BASE STATION, AND TERMINAL FOR FEEDING BACK CHANNEL STATE INFORMATION

TECHNICAL FIELD

The present document relates to the field of communication, and particularly, to a method for feeding back channel state information, a base station and a terminal.

BACKGROUND OF THE RELATED ART

After the Long Term Evolution (LTE) system goes through a plurality of versions R8/9/10, the R11 technology is accurately studied in succession. At present, part of R8 products start to be gradually commercial, and product planning needs to be further performed for the R9 and R10.

After going through the R8 and R9 stages, many new characteristics are added in the R10 based on the R8 and R9, such as pilot frequency characteristics including Demodulation Reference Signal (DMRS) and Channel State Information Reference Signal (CSI-RS), and transmission and feedback characteristics including 8-antennae support and so on, and especially, in the enhanced Inter-Cell Interference Cancelling (eICIC) technology, the inter-cell interference avoidance technology is further considered based on the consideration of R8/9 Inter-Cell Interference Cancelling (ICIC). With regard to the technology of solving the inter-cell interference problem, the cell interference avoidance in a homogeneous network is mainly considered at an initial stage of R10, wherein the eICIC technology and the Coordinated Multi-Point (CoMP) technology are primarily considered. The CoMP, as the name implies, is various nodes coordinating to send data to one or multiple User Equipments (UE) in the same time frequency resource or different time frequency resources. With such technology, the inter-cell interference can be reduced, which enhances the cell edge throughput rate and extends the cell coverage. However, since it considers that more scenarios are introduced in a heterogeneous network at a later stage of the discussion, due to a complexity of the CoMP technology and a time limitation of the R10 discussion, a final decision is that additional CoMP standardization contents are not introduced in the R10 stage, but when the CSI-RS is designed, the design can be performed considering needs of the CoMP part, and thus the CoMP technology is not further discussed after the 60 bis conference.

In the initial stage namely a Study Item (SI) stage of the R11 discussion, a uniform evaluation architecture is mainly determined by planning scenarios and various transmission technologies of the CoMP, and it is proved that a significant performance gain can be obtained with the CoMP technology through 2 stages of CoMP evaluation. In the CoMP SI conclusion that is completed recently, it is required to carry out further study on Joint Transmission (JT), Dynamic Point Selection (DPS) with/without muting, Coordinated Scheduling (CS) with/without muting and Coordinated Beamforming (CB) in the CoMP technology.

Before studying various technologies of the CoMP, what need to be firstly considered are differences possessed by the CoMP technology relative to the R8/9/10 technologies, wherein it includes how a control signaling of the CoMP supports a notification of the CoMP measurement set, how it supports demands of various transmission technologies of the CoMP, and how the UE measures and reports Channel State Information (CSI) of a plurality of nodes and so on. Wherein, how a network side uses a downlink control signaling to notify the UE to correctly receive and detect service data is one of primary problems required to be solved in the CoMP technology. The CoMP requires a plurality of nodes coordinating to send downlink service data or control channels to one UE, thus the UE needs to know configuration information of different nodes, and with regard to a traditional R8/R9/10 UE, it only accesses a primary serving cell during the initial access and only obtains system information of the primary serving cell, thus, when other nodes transmit data to the UE, a situation of incorrectly receiving the data may occur since system information of the relevant nodes are unknown.

In the latest R11 discussion process, a concept of CSI process is raised, one CSI process is related to one channel measurement part and one interference measurement part, one CSI process corresponds to one channel measurement assumption and one interference measurement assumption, and one CSI process requires a terminal feeding back one corresponding CSI. For a CoMP system, since each terminal needs to feed back CSIs of multiple Transmitting Points (TP), and scenarios of the CoMP and Carrier Aggregation (CA) are considered, the amount of CSIs required to be fed back by one terminal is very large, thus a collision problem will be caused at this point. For the CA, if a certain CSI element or a plurality of CSI elements have a collision between the CSI processes, which CSI is discarded is decided according to a priority of feedback type and carrier configuration. At this point, since different carriers require to feed back different CSIs, and the different carriers are independent with each other, all discards do not have a big impact on performance of the CA scenario. However, for the CoMP scenario, discarding CSIs will cause a limitation on the CoMP scheduling, thereby influencing the obtainment of the CoMP performance gain. If a scenario of combining the CoMP and the CA is considered, in a scenario where more CSIS are discarded, the CoMP performance gain of each carrier will be influenced. Therefore, it is required to further consider an optimization problem of the collision in the CoMP scenario, and especially, to consider a problem of how to avoid discarding when the collision occurs.

SUMMARY

The technical problem required to be solved by the present document is to provide a method for feeding back channel state information, a base station and a terminal, to solve the problem that a CSI collision causes a reduction of the system performance.

In order to solve the above problem, the present document provides a method for feeding back channel state information, which comprises:

a base station notifying a terminal of transmission resources used for transmitting a plurality of Channel State Information (CSIs) or a plurality of colliding CSIs and/or of priorities between a plurality of CSIs or a plurality of colliding CSIs.

The above method can be further characterized in that, the base station notifies the terminal by at least one of the following ways:

a terminal dedicated high layer signaling, a physical downlink control signaling and a preset rule.

The above method can be further characterized in that, the step of a base station notifying a terminal of transmission resources used for transmitting a plurality of channel state information CSIs or a plurality of colliding CSIs comprises:

the base station configuring collision resolution resources used for transmitting a plurality of CSIs or a plurality of colliding CSIs for the terminal through the terminal dedicated high layer signaling, and indicating the terminal to, if the plurality of CSIs have a collision in a same collision resolution resource, orderly transmit the colliding CSIs in the collision resolution resource according to the priorities.

The above method can be further characterized in that, the step of a base station notifying a terminal of transmission resources used for transmitting colliding CSIs comprises:

the base station configuring a plurality of sets of collision resolution resources used for transmitting the colliding CSIs for the terminal through the terminal dedicated high layer signaling, wherein, a set of collision resolution resources include collision resolution resources of one or more colliding CSIs; and indicating the terminal to, if the plurality of CSIs have a collision in a same collision resolution resource, orderly transmit the colliding CSIs in one set of the plurality of sets of collision resolution resources according to the priorities.

The above method can be further characterized in that, the step of orderly transmitting the colliding CSIs in the collision resolution resource or one set of the plurality of sets of collision resolution resources according to the priorities comprises:

if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs.

The above method can be further characterized in that, the step of a base station notifying a terminal of transmission resources used for transmitting colliding CSIs comprises:

the base station configuring Physical Uplink Shared Channel (PUSCH) resources used for transmitting colliding CSIs for the terminal through the terminal dedicated high layer signaling, and indicating the terminal to feed back all or part of the colliding CSIs through the PUSCH resources on subframes with CSI collision.

The above method can be further characterized in that, the step of a base station notifying a terminal of transmission resources used for transmitting colliding CSIs comprises:

the base station configuring PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through the PUSCH resources; and if the aperiodic triggered feedback and the PUSCH transmission exist, transmit aperiodic triggered CSIs or all or part of the colliding CSIs or CSIs with a highest priority according to aperiodic triggering and PUSCH transmission resources.

The above method can be further characterized in that, the step of a base station notifying a terminal of transmission resources used for transmitting colliding CSIs comprises:

the base station configuring a plurality of sets of PUSCH resources used for transmitting colliding CSIs through the terminal dedicated high layer signaling, and indicating the terminal to feed back all or part of the colliding CSIs through one set of the plurality of sets of PUSCH resources on subframes with CSI collision.

The above method can be further characterized in that, the step of a base station notifying a terminal of transmission resources used for transmitting colliding CSIs comprises:

the base station configuring a plurality of sets of PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through one set of the plurality of sets of PUSCH resources; and when the aperiodic triggered feedback and/or the PUSCH transmission exist, transmit aperiodic triggered CSIs or all or part of the colliding CSIs or CSIs with the highest priority according to aperiodic triggering and/or PUSCH transmission resources.

The above method can be further characterized in that, the method further comprises: the base station indicating which set of the plurality of sets of collision resolution resources or which set of the plurality of sets of PUSCH resources to be used for transmitting the colliding CSIs in a Downlink Control Information (DCI) Format 3 or a DCI Format 3A.

The above method can be further characterized in that, the step of a base station notifying a terminal of transmission resources used for transmitting colliding CSIs comprises:

when the base station triggers a terminal PUSCH resource allocation and/or sends uplink data on subframes by which the terminal feeds back a plurality of CSIs or a plurality of subframes with CSI collision, the base station indicating the terminal to send the plurality of CSIs or part or all of the colliding CSIs or the CSIs with the highest priority in the allocated PUSCH resources.

The above method can be further characterized in that, the step of a base station notifying a terminal of transmission resources used for transmitting colliding CSIs comprises:

when the base station triggers a terminal PUSCH resource allocation and/or sends uplink data on subframes by which the terminal feeds back a plurality of CSIs or a plurality of subframes with CSI collision, and no aperiodic feedback is triggered, the base station indicating the terminal to send the plurality of CSIs or all or part of the colliding CSIs or the CSIs with the highest priority in the allocated PUSCH resources.

The above method can be further characterized in that, the method further comprises: the base station triggering the terminal to feed back a plurality of colliding CSIs through a PUSCH on the subframes with CSI collision through a 1-bit signaling in a Format 0 of a common search space.

The above method can be further characterized in that, the method further comprises: when an uplink allocation without a transmitting block enabled is triggered on the subframes with CSI collision, the base station indicating the terminal to send the colliding CSIs on the PUSCH.

The above method can be further characterized in that, the method further comprises: the base station configuring the terminal to feed back CSIs in different feedback formats on subframes without CSI collision and subframes with CSI collision.

The above method can be further characterized in that, the base station configures the terminal to feed back the CSIs in a format 2 or a format 2a or a format 2b on the subframes without CSI collision, and to feed back the CSIs in the format 3 or other one or more kinds of feedback formats except the format 2 and/or the format 2a and/or the format 2b on the subframes with CSI collision.

The above method can be further characterized in that, the method further comprises: the base station configuring the terminal to feed back the CSIs in different feedback formats in different subframe clusters through the terminal dedicated high layer signaling.

The above method can be further characterized in that, the method further comprises:

the base station configuring that a priority of a CSI of a first feedback format of the terminal is higher than a priority of a CSI of a second feedback format of the terminal, and indicating the terminal to, when the CSI of the first feedback format collides with the CSI of the second feedback format, preferentially discard the CSI of the second feedback format.

The above method can be further characterized in that, the first feedback format is the format 3, and the second feedback format is the format 2 or the format 2a or the format 2b.

The present document further provides a method for feeding back channel state information, which comprises:

a terminal acquiring transmission resources used for transmitting a plurality of Channel State Information (CSIs) or a plurality of colliding CSIs and/or priorities between a plurality of CSIs or a plurality of colliding CSIs from a base station.

The above method can be further characterized in that, the terminal acquires the transmission resources used for transmitting the colliding CSIs and/or the priorities between the plurality of colliding CSIs by at least one of the following ways:

a terminal dedicated high layer signaling, a physical downlink control signaling and a preset rule.

The above method can be further characterized in that, the step of a terminal acquiring transmission resources used for transmitting a plurality of channel state information CSIs or a plurality of colliding CSIs comprises:

the terminal acquiring collision resolution resources used for transmitting a plurality of CSIs or a plurality of colliding CSIs and configured by the base station for the terminal through the terminal dedicated high layer signaling; and if the plurality of CSIs have a collision in a same collision resolution resource, the terminal orderly transmitting the colliding CSIs in the collision resolution resource according to the priorities.

The above method can be further characterized in that, the step of a terminal acquiring transmission resources used for transmitting colliding CSIs comprises:

the terminal acquiring a plurality of sets of collision resolution resources used for transmitting the colliding CSIs and configured by the base station for the terminal through the terminal dedicated high layer signaling, wherein, a set of collision resolution resources include collision resolution resources of one or more colliding CSIs; and if the plurality of CSIs have a collision in a same collision resolution resource, the terminal orderly transmitting the colliding CSIs in one set of the plurality of sets of collision resolution resources according to the priorities.

The above method can be further characterized in that, the step of the terminal orderly transmitting the colliding CSIs in the collision resolution resource or one set of the plurality of sets of collision resolution resources according to the priorities comprises:

if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs.

The above method can be further characterized in that, the step of a terminal acquiring transmission resources used for transmitting colliding CSIs comprises:

the terminal acquiring Physical Uplink Shared Channel (PUSCH) resources used for transmitting colliding CSIs and configured by the base station for the terminal through the terminal dedicated high layer signaling; and the terminal feeding back all or part of the colliding CSIs through the PUSCH resources on subframes with CSI collision.

The above method can be further characterized in that, the step of a terminal acquiring transmission resources used for transmitting colliding CSIs comprises:

the terminal acquiring PUSCH resources used for transmitting colliding CSIs and configured by the base station through the terminal dedicated high layer signaling; and on subframes with CSI collision, if no aperiodic triggered feedback and no PUSCH transmission exist, the terminal feeding back all or part of the colliding CSIs through the PUSCH resources; and if the aperiodic triggered feedback and the PUSCH transmission exist, the terminal transmitting aperiodic triggered CSIs or all or part of the colliding CSIs or CSIs with a highest priority according to aperiodic triggering and PUSCH transmission resources.

The above method can be further characterized in that, the step of a terminal acquiring transmission resources used for transmitting colliding CSIs comprises:

The terminal acquiring a plurality of sets of PUSCH resources used for transmitting colliding CSIs and configured by the base station through the terminal dedicated high layer signaling; and the terminal feeding back all or part of the colliding CSIs through one set of the plurality of sets of PUSCH resources on subframes with CSI collision.

The above method can be further characterized in that, the step of a terminal acquiring transmission resources used for transmitting colliding CSIs comprises:

the terminal acquiring a plurality of sets of PUSCH resources used for transmitting colliding CSIs and configured by the base station through the terminal dedicated high layer signaling; and on subframes with CSI collision, if no aperiodic triggered feedback and no PUSCH transmission exist, the terminal feeding back all or part of the colliding CSIs through one set of the plurality of sets of PUSCH resources; and when the aperiodic triggered feedback and/or the PUSCH transmission exist, the terminal transmitting aperiodic triggered CSIs or all or part of the colliding CSIs or CSIs with the highest priority according to aperiodic triggering and/or PUSCH transmission resources.

The above method can be further characterized in that, the method further comprises: the terminal acquiring which set of the plurality of sets of collision resolution resources or which set of the plurality of sets of PUSCH resources to be used for transmitting the colliding CSIs in a Downlink Control Information (DCI) Format 3 or a DCI Format 3A.

The above method can be further characterized in that, the step of a terminal acquiring transmission resources used for transmitting colliding CSIs comprises:

on subframes by which the terminal feeds back a plurality of CSIs or a plurality of subframes with CSI collision, when the base station triggers a terminal PUSCH resource allocation and/or sends uplink data, the terminal sending the plurality of CSIs or part or all of the colliding CSIs or the CSIs with the highest priority in the allocated PUSCH resources.

The above method can be further characterized in that, the step of a terminal acquiring transmission resources used for transmitting colliding CSIs comprises:

on subframes by which the terminal feeds back a plurality of CSIs or a plurality of subframes with CSI collision, when the base station triggers a terminal PUSCH resource allocation and/or sends uplink data, and no aperiodic feedback is triggered, the terminal sending the plurality of CSIs or all or part of the colliding CSIs or the CSIs with the highest priority in the allocated PUSCH resources.

The above method can be further characterized in that, the method further comprises: when a 1-bit triggering signaling in a Format 0 of a common search space is received, the terminal feeding back a plurality of colliding CSIs through a PUSCH on the subframes with CSI collision.

The above method can be further characterized in that, the method further comprises:

on the subframes with CSI collision, when the terminal detects an uplink allocation PUSCH resource without a transmitting block enabled in downlink control information, the terminal sending the colliding CSIs on the PUSCH.

The above method can be further characterized in that, the method further comprises: the terminal feeding back CSIS in different feedback formats on subframes without CSI collision and subframes with CSI collision.

The above method can be further characterized in that, the terminal feeds back the CSIs in a format 2 or a format 2a or a format 2b on the subframes without CSI collision, and feeds back the CSIs in the format 3 or other one or more kinds of feedback formats except the format 2 and/or the format 2a and/or the format 2b on the subframes with CSI collision.

The above method can be further characterized in that, the terminal receives the terminal dedicated high layer signaling, and feeds back the CSIs in different feedback formats in different subframe clusters according to the terminal dedicated high layer signaling.

The above method can be further characterized in that, the method further comprises:

when a CSI of a first feedback format collides with a CSI of a second feedback format, the terminal preferentially discarding the CSI of the second feedback format.

The above method can be further characterized in that, the first feedback format is the format 3, and the second feedback format is the format 2 or the format 2a or the format 2b.

The present document further provides a base station, which comprises:

a notification unit, configured to: notify a terminal of transmission resources used for transmitting a plurality of Channel State Information (CSIs) or a plurality of colliding CSIs and/or of priorities between a plurality of CSIs or a plurality of colliding CSIs.

The above base station can be further characterized in that, the notification unit notifies the terminal by at least one of the following ways:

a terminal dedicated high layer signaling, a physical downlink control signaling and a preset rule.

The above base station can be further characterized in that, the notification unit notifies the terminal of the transmission resources used for transmitting the plurality of channel state information CSIs or the plurality of colliding CSIs by the following way:

the notification unit configuring collision resolution resources used for transmitting a plurality of CSIs or a plurality of colliding CSIs for the terminal through the terminal dedicated high layer signaling, and indicating the terminal to, if the plurality of CSIS have a collision in a same collision resolution resource, orderly transmit the colliding CSIs in the collision resolution resource according to the priorities.

The above base station can be further characterized in that, the notification unit notifies the terminal of the transmission resources used for transmitting the colliding CSIs by the following way:

the notification unit configuring a plurality of sets of collision resolution resources used for transmitting the colliding CSIs for the terminal through the terminal dedicated high layer signaling, wherein, a set of collision resolution resources include collision resolution resources of one or more colliding CSIS; and indicating the terminal to, if the plurality of CSIS have a collision in a same collision resolution resource, orderly transmit the colliding CSIs in one set of the plurality of sets of collision resolution resources according to the priorities.

The above base station can be further characterized in that, the colliding CSIS is orderly transmitted in the collision resolution resource or one set of the plurality of sets of collision resolution resources according to the priorities by the following way:

if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs.

The above base station can be further characterized in that, the notification unit notifies the terminal of the transmission resources used for transmitting the colliding CSIs by the following way:

the notification unit configuring Physical Uplink Shared Channel (PUSCH) resources used for transmitting colliding CSIs for the terminal through the terminal dedicated high layer signaling, and indicating the terminal to feed back all or part of the colliding CSIs through the PUSCH resources on subframes with CSI collision.

The above base station can be further characterized in that, the notification unit notifies the terminal of the transmission resources used for transmitting the colliding CSIs by the following way:

the notification unit configuring PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through the PUSCH resources; and if the aperiodic triggered feedback and the PUSCH transmission exist, transmit aperiodic triggered CSIs or all or part of the colliding CSIs or CSIs with a highest priority according to aperiodic triggering and PUSCH transmission resources.

The above base station can be further characterized in that, the notification unit notifies the terminal of the transmission resources used for transmitting the colliding CSIs by the following way:

the notification unit configuring a plurality of sets of PUSCH resources used for transmitting colliding CSIs through the terminal dedicated high layer signaling, and indicating the terminal to feed back all or part of the colliding CSIs through one set of the plurality of sets of PUSCH resources on subframes with CSI collision.

The above base station can be further characterized in that, the notification unit notifies the terminal of the transmission resources used for transmitting the colliding CSIs by the following way:

the notification unit configuring a plurality of sets of PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through one set of the plurality of sets of PUSCH resources; and when the aperiodic triggered feedback and/or the PUSCH transmission exist, transmit aperiodic triggered CSIs or all or part of the colliding CSIs or CSIs with the highest priority according to aperiodic triggering and/or PUSCH transmission resources.

The above base station can be further characterized in that, the notification unit is further configured to: indicate which set of the plurality of sets of collision resolution resources or which set of the plurality of sets of PUSCH resources to be used for transmitting the colliding CSIs in a Downlink Control Information (DCI) Format 3 or a DCI Format 3A.

The above base station can be further characterized in that, the notification unit notifies the terminal of the transmission resources used for transmitting the colliding CSIs by the following way:

when the notification unit triggers a terminal PUSCH resource allocation and/or sends uplink data on subframes by which the terminal feeds back a plurality of CSIs or a plurality of subframes with CSI collision, the notification unit indicating the terminal to send the plurality of CSIs or part or all of the colliding CSIs or the CSIs with the highest priority in the allocated PUSCH resources.

The above base station can be further characterized in that, the notification unit notifies the terminal of the transmission resources used for transmitting the colliding CSIs by the following way:

when the notification unit triggers a terminal PUSCH resource allocation and/or sends uplink data on subframes by which the terminal feeds back a plurality of CSIs or a plurality of subframes with CSI collision, and no aperiodic feedback is triggered, the notification unit indicating the terminal to send the plurality of CSIs or all or part of the colliding CSIs or the CSIs with the highest priority in the allocated PUSCH resources.

The above base station can be further characterized in that, the notification unit is further configured to: trigger the terminal to feed back a plurality of colliding CSIs through a PUSCH on the subframes with CSI collision through a 1-bit signaling in a Format 0 of a common search space.

The above base station can be further characterized in that, the notification unit is further configured to: when an uplink allocation without a transmitting block enabled is triggered on the subframes with CSI collision, indicate the terminal to send the colliding CSIs on the PUSCH.

The above base station can be further characterized in that, the notification unit is further configured to: configure the terminal to feed back CSIs in different feedback formats on subframes without CSI collision and subframes with CSI collision.

The above base station can be further characterized in that, the notification unit is further configured to: configure the terminal to feed back the CSIs in a format 2 or a format 2a or a format 2b on the subframes without CSI collision, and to feed back the CSIs in the format 3 or other one or more kinds of feedback formats except the format 2 and/or the format 2a and/or the format 2b on the subframes with CSI collision.

The above base station can be further characterized in that, the notification unit is further configured to: configure the terminal to feed back the CSIs in different feedback formats in different subframe clusters through the terminal dedicated high layer signaling.

The above base station can be further characterized in that, the notification unit is further configured to:

configure that a priority of a CSI of a first feedback format of the terminal is higher than a priority of a CSI of a second feedback format of the terminal, and when the CSI of the first feedback format collides with the CSI of the second feedback format, indicate the terminal to preferentially discard the CSI of the second feedback format.

The above base station can be further characterized in that, the first feedback format is the format 3, and the second feedback format is the format 2 or the format 2a or the format 2b.

The present document further provides a terminal, the terminal comprises a feedback unit, configured to: acquire transmission resources used for transmitting a plurality of Channel State Information (CSIs) or a plurality of colliding CSIs and/or priorities between a plurality of CSIs or a plurality of colliding CSIs from a base station.

The above terminal can be further characterized in that, the feedback unit acquires the transmission resources used for transmitting the colliding CSIs and/or the priorities between the plurality of colliding CSIs by at least one of the following ways:

a terminal dedicated high layer signaling, a physical downlink control signaling and a preset rule.

The above terminal can be further characterized in that, the feedback unit acquires the transmission resources used for transmitting the plurality of channel state information CSIs or the plurality of colliding CSIs by the following way:

acquiring collision resolution resources used for transmitting a plurality of CSIs or a plurality of colliding CSIs and configured by the base station for the terminal through the terminal dedicated high layer signaling; and if the plurality of CSIs have a collision in a same collision resolution resource, orderly transmitting the colliding CSIs in the collision resolution resource according to the priorities.

The above terminal can be further characterized in that, the feedback unit acquires the transmission resources used for transmitting the colliding CSIs by the following way:

the feedback unit acquiring a plurality of sets of collision resolution resources used for transmitting the colliding CSIs and configured by the base station for the terminal through the terminal dedicated high layer signaling, wherein, a set of collision resolution resources include collision resolution resources of one or more colliding CSIs; and if the plurality of CSIs have a collision in a same resource, orderly transmitting the colliding CSIs in one set of the plurality of sets of collision resolution resources according to the priorities.

The above terminal can be further characterized in that, the feedback unit orderly transmits the colliding CSIs in the collision resolution resource or one set of the plurality of sets of collision resolution resources according to the priorities by the following way:

if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs.

The above terminal can be further characterized in that, the feedback unit acquires the transmission resources used for transmitting the colliding CSIs by the following way:

acquiring Physical Uplink Shared Channel (PUSCH) resources used for transmitting colliding CSIs and configured by the base station for the terminal through the terminal dedicated high layer signaling; and feeding back all or part of the colliding CSIs through the PUSCH resources on subframes with CSI collision.

The above terminal can be further characterized in that, the feedback unit acquires the transmission resources used for transmitting the colliding CSIs by the following way:

acquiring PUSCH resources used for transmitting colliding CSIs and configured by the base station through the terminal dedicated high layer signaling; and on subframes with CSI collision, if no aperiodic triggered feedback and no PUSCH transmission exist, feeding back all or part of the colliding CSIs through the PUSCH resources; and if the aperiodic triggered feedback and the PUSCH transmission exist, transmitting aperiodic triggered CSIs or all or part of the colliding CSIs or CSIs with a highest priority according to aperiodic triggering and PUSCH transmission resources.

The above terminal can be further characterized in that, the feedback unit acquires the transmission resources used for transmitting the colliding CSIs by the following way:

acquiring a plurality of sets of PUSCH resources used for transmitting colliding CSIs and configured by the base station through the terminal dedicated high layer signaling; and feeding back all or part of the colliding CSIs through one set of the plurality of sets of PUSCH resources on subframes with CSI collision.

The above terminal can be further characterized in that, the feedback unit acquires the transmission resources used for transmitting the colliding CSIs by the following way:

acquiring a plurality of sets of PUSCH resources used for transmitting colliding CSIs and configured by the base station through the terminal dedicated high layer signaling; and on subframes with CSI collision, if no aperiodic triggered feedback and no PUSCH transmission exist, feeding back all or part of the colliding CSIs through one set of the plurality of sets of PUSCH resources; and when the aperiodic triggered feedback and/or the PUSCH transmission exist, transmitting aperiodic triggered CSIs or all or part of the colliding CSIs or CSIs with the highest priority according to aperiodic triggering and/or PUSCH transmission resources.

The above terminal can be further characterized in that, the feedback unit is further configured to: acquire which set of the plurality of sets of collision resolution resources or which set of the plurality of sets of PUSCH resources to be used for transmitting the colliding CSIs in a Downlink Control Information (DCI) Format 3 or a DCI Format 3A.

The above terminal can be further characterized in that, the feedback unit is further configured to: on subframes by which the terminal feeds back a plurality of CSIs or a plurality of subframes with CSI collision, when the base station triggers a terminal PUSCH resource allocation and/or sends uplink data, send the plurality of CSIs or part or all of the colliding CSIs or the CSIs with the highest priority in the allocated PUSCH resources.

The above terminal can be further characterized in that, the feedback unit is further configured to: on subframes by which the terminal feeds back a plurality of CSIs or a plurality of subframes with CSI collision, when the base station triggers a terminal PUSCH resource allocation and/or sends uplink data, and no aperiodic feedback is triggered, send the plurality of CSIs or all or part of the colliding CSIs or the CSIs with the highest priority in the allocated PUSCH resources.

The above terminal can be further characterized in that, the feedback unit is further configured to: when a 1-bit triggering signaling in a Format 0 of a common search space is received, feed back a plurality of colliding CSIs through a PUSCH on the subframes with CSI collision.

The above terminal can be further characterized in that, the feedback unit is further configured to: on the subframes with CSI collision, when an uplink allocation PUSCH resource without a transmitting block enabled in downlink control information is detected, send the colliding CSIs on the PUSCH.

The above terminal can be further characterized in that, the feedback unit is further configured to: feed back the CSIs in different feedback formats on subframes without CSI collision and subframes with CSI collision.

The above terminal can be further characterized in that, the feedback unit is further configured to: feed back the CSIs in a format 2 or a format 2a or a format 2b on the subframes without CSI collision, and feed back the CSIs in the format 3 or other one or more kinds of feedback formats except the format 2 and/or the format 2a and/or the format 2b on the subframes with CSI collision.

The above terminal can be further characterized in that, the feedback unit is further configured to: receive the terminal dedicated high layer signaling, and feed back the CSIs in different feedback formats in different subframe clusters according to the terminal dedicated high layer signaling.

The above terminal can be further characterized in that, the feedback unit is further configured to:

when a CSI of a first feedback format collides with a CSI of a second feedback format, preferentially discard the CSI of the second feedback format.

The above terminal can be further characterized in that, the first feedback format is the format 3, and the second feedback format is the format 2 or the format 2a or the format 2b.

In the present document, the base station indicates the terminal on how to handle a feedback of the colliding CSIs when collision between the CSIs occurs during processes of feeding back a plurality of CSIs via a high layer signaling or a preset rule, which enables the base station and the terminal to reach a uniform feedback mechanism, and guarantees a minimum possibility of discarding CSIs, thereby solving the problem of the impact on the CoMP performance due to discarding excessive CSIs.

PREFERRED EMBODIMENTS OF THE INVENTION

In order to make the object, technical scheme and advantages of the present document more clear, the examples of the present document will be described in detail below. It should be noted that the examples in the present document and the characteristics in the examples can be optionally combined with each other in the condition of no conflict.

Hereinafter, a colliding subframe is a subframe with CSI collision, and a non-colliding subframe is a subframe without CSI collision; or, the colliding subframe is a subframe transmitting a plurality of CSIs, and the non-colliding subframe is a subframe only transmitting one CSI.

In the examples of the present document, the resource allocation problem of a plurality of colliding CSIs also can be interpreted as the resource allocation problem of a plurality of CSIs, therefore, a plurality of colliding CSIs also can be interpreted as a plurality of CSIs below. For a concise narration, descriptions are made by taking a plurality of colliding CSIs as an example in the following descriptions, but the following examples are also applicable to a situation of a plurality of CSIs.

The example of the present document provides a method for feeding back channel state information, wherein a base station notifies a terminal of transmission resources used for transmitting a plurality of channel state information CSIs or a plurality of colliding CSIs and/or priorities between a plurality of CSIs or a plurality of colliding CSIs.

Wherein, the base station notifies the terminal in at least one of the following ways:
1. Terminal dedicated high layer signaling.
2. Physical downlink control signaling.
3. Preset rule.

Notifying the terminal through the preset rule includes: the bases station and the terminal making an appointment in advance.

Wherein, the base station configures collision resolution resources used for transmitting a plurality of CSIs or a plurality of colliding CSIs for the terminal through the terminal dedicated high layer signaling, and if the plurality of CSIs have a collision in the same collision resolution resource, indicates the terminal to orderly transmit the colliding CSIs in the collision resolution resource according to the priorities. Specifically, if a number of the collision resolution resources is less than a number of CSI collisions, part of CSIs are discarded, and a priority of a CSI that is discarded is lower than a priority of a CSI that is not discarded; and if the number of the collision resolution resources is greater than the number of the CSI collisions, only collision resolution resources corresponding to the plurality of colliding CSIs are occupied.

Wherein, the collision resolution resources can be Physical Uplink Control Channel (PUCCH) resources.

Wherein, the base station configures a plurality of sets of collision resolution resources used for transmitting the colliding CSIs for the terminal through the terminal dedicated high layer signaling, wherein, a set of collision resolution resources include collision resolution resources of one or more colliding CSIs; and indicates the terminal to, if the plurality of CSIs have a collision in the same collision resolution resource, orderly transmit the plurality of colliding CSIs in one set of the plurality of sets of collision resolution resources according to the priorities. Specifically, if the number of the sets of collision resolution resources used for transmitting the plurality of CSIs is less than the number of the colliding CSIs, part of CSIS are discarded, and a priority of a CSI that is discarded is lower than a priority of a CSI that is not discarded; and if the number of the sets of collision resolution resources used for transmitting the plurality of CSIs is greater than the number of the colliding CSIs, only preset collision resolution resources corresponding to the plurality of colliding CSIs are occupied. Wherein, the base station indicates which set of the plurality of sets of collision resolution resources to be used for transmitting the plurality of colliding CSIs in a DCI Format 3 or a DCI Format 3A.

Wherein, the base station triggers the terminal to feed back a plurality of colliding CSIs through a PUSCH on the subframes with CSI collision through a signaling in a Format 0 of common search space. The signaling can be of 1 bit.

Wherein, when triggering an uplink allocation without a Transmitting Block (TB) enabled on the colliding subframes, the base station indicates the terminal to send the colliding CSIs on the PUSCH.

Wherein, the base station configures the terminal to feed back CSIs in different feedback formats respectively on non-colliding subframes and colliding subframes. For example, the base station configures the terminal to feed back the CSIs in a third feedback format on the non-colliding subframes, and to feed back the CSIs in a fourth feedback format on the colliding subframes. The third feedback format can be a format 2 or a format 2a or a format 2b, and the fourth feedback format can be a format 3 and also can be other formats except the format 2 and/or the format 2a and/or the format 2b.

Wherein, the base station configures the terminal to adopt different feedback formats in different subframe clusters through the terminal dedicated high layer signaling. The subframe clusters are subframe sets, and each subframe cluster includes one or more subframes.

Wherein, the base station configures that a priority of a CSI of a first feedback format of the terminal is higher than a priority of a CSI of a second feedback format of the terminal, and indicates the terminal to, when the CSI of the first feedback format collides with the CSI of the second feedback format, preferentially discard the CSI of the second feedback format. Wherein, the first feedback format is the format 3, and the second feedback format is the format 2 or the format 2a or the format 2b. Certainly, the first feedback format and the second feedback format also can be other feedback formats, which is not limited in the present document.

Wherein, the base station configures PUSCH resources used for transmitting the plurality of colliding CSIs for the terminal through the terminal dedicated high layer signaling, and indicates the terminal to feed back all or part of the colliding CSIs through the PUSCH resources on the colliding subframes.

Wherein, the base station pre-configures PUSCH resources used for transmitting the plurality of colliding CSIs for the terminal through the terminal dedicated high layer signaling, and indicates the terminal to perform transmission in the following way: on the colliding subframes without aperiodic triggered feedback and the colliding subframes without PUSCH transmission, indicating the terminal to feed back all or part of the colliding CSIs through the PUSCH resources pre-configured through the terminal dedicated high layer signaling on the colliding subframes. If the aperiodic triggered feedback and the PUSCH transmission exist on the colliding subframes, aperiodic triggered CSIs or all or part of the colliding CSIs or CSIs with a highest priority are transmitted according to aperiodic triggering and PUSCH transmission resources (the PUSCH transmission resources refer to PUSCH transmission resources that have uplink services).

Wherein, when the base station triggers a terminal PUSCH resource allocation and/or sends uplink data on subframes by which the terminal feeds back a plurality of CSIs or a plurality of subframes with CSI collision, the terminal is required to send the plurality of colliding CSIs or the plurality of CSIs or the CSIs with the highest priority in the corresponding PUSCH resources.

Wherein, when the base station triggers a terminal PUSCH resource allocation and/or sends uplink data on subframes by which the terminal feeds back a plurality of CSIs or a plurality of subframes with CSI collision, but no aperiodic feedback is triggered, the terminal sends the plurality of colliding CSIs or the plurality of CSIs or the CSIs with the highest priority in the corresponding PUSCH resources.

The base station pre-configures a plurality of sets of preset PUSCH resources used for transmitting the plurality of colliding CSIs for the terminal through the terminal dedicated high layer signaling, and indicates the terminal to feed back all or part of the colliding CSIs through the PUSCH resources pre-configured through the terminal dedicated high layer signaling on the colliding subframes. The base station dynamically indicates to terminal which set of resources of the configured plurality of sets of preset PUSCH resources to be used for transmitting the plurality of colliding CSIs through the DCI Format 3/3A of a common control area.

Wherein, the base station pre-configures a plurality of sets of PUSCH resources used for transmitting the plurality of colliding CSIs for the terminal through the terminal dedicated high layer signaling, and indicates the terminal to: on the colliding subframes, if no aperiodic triggered feedback and no PUSCH transmission exist, feed back all or part of the colliding CSIs through the PUSCH resources on the colliding subframes; and if the aperiodic triggered feedback and/or the PUSCH transmission exist, transmit aperiodic triggered CSIs or all or part of the colliding CSIs or CSIs with a highest priority according to aperiodic triggering and/or PUSCH transmission resources. The base station indicates to terminal which set of resources of the configured plurality of sets of PUSCH resources to be used for transmitting the plurality of colliding CSIs through the DCI Format 3/3A of the common control area.

Descriptions of Terminal:

The example of the present document further provides a method for feeding back channel state information, a terminal acquires transmission resources used for transmitting a plurality of channel state information CSI or a plurality of colliding CSIs and/or priorities between a plurality of CSIs or a plurality of colliding CSIs from a base station.

Wherein, the terminal acquires in at least one of the following ways:
1. Terminal dedicated high layer signaling.
2. Physical downlink control signaling.
3. Preset rule.

Wherein, the terminal obtains collision resolution resources used for transmitting a plurality of CSIs or a plurality of colliding CSIs and configured by the base station through the terminal dedicated high layer signaling. If the plurality of CSIS have a collision in the same collision resolution resource, the terminal orderly transmits the colliding CSIs in the collision resolution resource according to the priorities. Wherein, if the number of the collision resolution resources is less than the number of CSI collisions, part of CSIS are discarded, and if the number of the collision resolution resources is greater than the number of CSI collisions, only preset collision resolution resources corresponding to the plurality of colliding CSIS are occupied.

Wherein, the terminal obtains a plurality of sets of collision resolution resources used for transmitting the colliding CSIs through the terminal dedicated high layer signaling. If the plurality of CSIs have a collision in the same resource, the colliding CSIs are orderly transmitted in the collision resolution resource according to the priorities. If the number of the collision resolution resources is less than the number of CSI collisions, a CSI with a low priority is discarded, and if the number of the collision resolution resources is greater than the number of CSI collisions, only preset collision resolution resources corresponding to the plurality of colliding CSIs are occupied. The terminal acquires which set of the plurality of sets of collision resolution resources to be used for transmitting the colliding CSIs by detecting a DCI Format 3 or a DCI Format 3A.

Wherein, after receiving a 1-bit triggering signaling in a Format 0 of a common search space, the terminal feeds back a plurality of colliding CSIs through a PUSCH on the subframes with CSI collision.

Wherein, on the colliding subframes, when the terminal detects an uplink allocation PUSCH resource without a TB enabled in Downlink Control Information (DCI), the colliding CSIs are sent on the PUSCH.

Wherein, the terminal feeds back the CSIs in different feedback formats respectively on non-colliding subframes and colliding subframes.

Wherein, the terminal feeds back the CSIs in a format 2 or a format 2a or a format 2b on the non-colliding subframes, and feeds back the CSIs in the format 3 on the colliding subframes.

Wherein, the terminal receives the terminal dedicated high layer signaling, and feeds back the CSIs in different feedback formats in different subframe clusters according to the terminal dedicated high layer signaling.

Wherein, a priority of the terminal feedback type format 3 is higher than a priority of the format 2 or the format 2a or the format 2b, and when a CSI of the format 3 collides with a CSI of the format 2 or the format 2a or the format 2b, the CSI of the format 2 or the format 2a or the format 2b is preferentially discarded.

Wherein, the terminal obtains PUSCH resources used for transmitting colliding CSIs by receiving the terminal dedicated high layer signaling, and the terminal feeds back all or part of the colliding CSIs through the PUSCH resources on the colliding subframes.

Wherein, the terminal obtains PUSCH resources used for transmitting colliding CSIs through the terminal dedicated high layer signaling; and on the colliding subframes, if no aperiodic triggered feedback and no PUSCH transmission exist, the terminal feeds back all or part of the colliding CSIs through the PUSCH resources; and if the aperiodic triggered feedback and/or the PUSCH transmission exist, transmits aperiodic triggered CSIs or all or part of the colliding CSIs or CSIs with a highest priority according to aperiodic triggering and/or PUSCH transmission resources.

Wherein, on subframes by which the terminal feeds back a plurality of CSIs or a plurality of subframes with CSI collision, when the base station triggers a terminal PUSCH resource allocation and/or sends uplink data, the terminal sends the plurality of CSIs or part or all of the colliding CSIs or the CSIs with the highest priority in the allocated PUSCH resources.

Wherein, on subframes by which the terminal feeds back a plurality of CSIs or a plurality of subframes with CSI collision, when the base station triggers a terminal PUSCH resource allocation and/or sends uplink data, and no aperiodic feedback is triggered, the terminal sends the plurality of CSIs or all or part of the colliding CSIs or the CSIs with the highest priority in the allocated PUSCH resources.

Wherein, the terminal acquires a plurality of sets of PUSCH resources used for transmitting colliding CSIs and configured by the base station through the terminal dedicated high layer signaling; and the terminal feeds back all or part of the colliding CSIs through one set of the plurality of sets of PUSCH resources on the subframes with CSI collision. Moreover, it is to dynamically acquire that which set of resources of the configured plurality of sets of PUSCH resources is used to transmit the colliding CSIs by detecting the DCI Format 3/3A of a common control area.

Wherein, the terminal acquires a plurality of sets of PUSCH resources used for transmitting colliding CSIs and configured by the base station through the terminal dedicated high layer signaling; and on the subframes with CSI collision, if no aperiodic triggered feedback and no PUSCH transmission exist, the terminal feeds back all or part of the colliding CSIs through one set of the plurality of sets of PUSCH resources; and when the aperiodic triggered feedback and/or the PUSCH transmission exist, transmits aperiodic triggered CSIs or all or part of the colliding CSIs or CSIs with the highest priority according to aperiodic triggering and/or PUSCH transmission resources.

The terminal dynamically acquires which set of resources of the configured plurality of sets of PUSCH resources for transmitting the colliding CSIs by detecting the DCI Format 3/3A of the common control area.

The CSI can be a CSI process, a priority of a CSI can be determined according to a priority of the CSI process and/or a feedback type. One CSI process is consisted of a combination corresponding to one channel part and one interference part. The channel part includes state information of the channel, and the interference part includes interference information of a corresponding CSI process.

For an easy understanding of the present document, the present document will be further described in combination with specific examples below.

Wherein, the format 3 in the present document refers to a transmission format applied to CSI and/or a Hybrid Automatic Repeat Request (HARQ) by using a compression principle and mechanism of the format 3 HARQ.

Wherein, an indication method for the Format 3/3A is only used for the Format 3/3A indication in the current colliding subframes. Or, when a power control signaling also exists in UL_Grant, the indication method for the Format 3/3A also can be adopted at this point.

EXAMPLE 1

A base station configures preset collision resolution resources for transmitting a plurality of colliding CSIs for a terminal through a terminal dedicated high layer signaling. It indicates the terminal that, if the plurality of CSIS have a collision in the same collision resolution resource, the resources for colliding respectively perform transmission in the preset collision resolution resource for transmitting one or more colliding CSIs configured for the terminal through a terminal dedicated high layer signaling according to the priorities, if the number of the collision resolution resources is less than the number of CSI collisions, CSIs with low priorities are discarded, and if the number of the collision resolution resources is greater than the number of CSI collisions, only the preset collision resolution resources corresponding to the plurality of colliding CSIs are occupied.

The terminal obtains the preset collision resolution resources for transmitting one or more colliding CSIs through the terminal dedicated high layer signaling configuration. If the plurality of CSIs have a collision in the same collision resolution resource, the resources for colliding respectively perform transmission in the preset collision resolution resource for transmitting the plurality of colliding CSIs configured for the terminal through a terminal dedicated high layer signaling according to the priorities, if the number of the collision resolution resources is less than the number of CSI collisions, CSIs with low priorities are discarded, and if the number of the collision resolution resources is greater than the number of CSI collisions, only the preset collision resolution resources corresponding to the plurality of colliding CSIS are occupied.

EXAMPLE 2

A base station configures preset collision resolution PUCCH resources for transmitting a plurality of colliding CSIs for a terminal through a terminal dedicated high layer signaling. It indicates the terminal that, if a plurality of CSIs have a collision in the same collision resolution resource, the resources for colliding respectively perform transmission in the preset collision resolution PUCCH resource for transmitting the plurality of colliding CSIs configured for the terminal through a terminal dedicated high layer signaling according to the priorities, if the number of the collision resolution resources is less than the number of CSI collisions, a CSI with a low priority is discarded, and if the number of the collision resolution resources is greater than the number of CSI collisions, only the preset collision resolution PUCCH resources corresponding to the plurality of colliding CSIs are occupied.

The terminal obtains the preset collision resolution PUCCH resources for transmitting a plurality of colliding CSIs through the terminal dedicated high layer signaling configuration. If a plurality of CSIs have a collision in the same collision resolution resource, the resources for colliding respectively perform transmission in the preset collision resolution PUCCH resource for transmitting the plurality of colliding CSIs configured for the terminal through a terminal dedicated high layer signaling according to the priorities, if the number of the collision resolution resources is less than the number of CSI collisions, a CSI with a low priority is discarded, and if the number of the collision resolution resources is greater than the number of CSI collisions, only the preset collision resolution PUCCH resources corresponding to the plurality of colliding CSIs are occupied.

EXAMPLE 3

A base station configures a plurality of sets of preset collision resolution PUCCH resources for transmitting a plurality of colliding CSIs to a terminal through a terminal dedicated high layer signaling. It indicates the terminal that, if a plurality of CSIs have a collision in the same collision resolution resource, the resources for colliding respectively perform transmission in the preset collision resolution PUCCH resource for transmitting the plurality of colliding CSIs configured for the terminal through a terminal dedicated high layer signaling according to the priorities, if the number of the collision resolution resources is less than the number of CSI collisions, a CSI with a low priority is discarded, and if the number of the collision resolution resources is greater than the number of CSI collisions, only the preset collision resolution PUCCH resources corresponding to the plurality of colliding CSIs are occupied. The base station dynamically indicates which set of the plurality of sets of preset collision resolution PUCCH resources to be used for transmitting the plurality of colliding CSIs in a DCI Format 3 or a DCI Format 3A.

The terminal obtains a plurality of sets of preset collision resolution PUCCH resources for transmitting a plurality of colliding CSIs through the terminal dedicated high layer signaling. If a plurality of CSIs have a collision in the same collision resolution resource, the resources for colliding respectively perform transmission in the preset collision resolution PUCCH resource for transmitting the plurality of colliding CSIs configured for the terminal through a terminal dedicated high layer signaling according to the priorities, if the number of the collision resolution resources is less than the number of CSI collisions, a CSI with a low priority is discarded, and if the number of the collision resolution resources is greater than the number of CSI collisions, only the preset collision resolution resources corresponding to the plurality of colliding CSIs are occupied. The terminal dynamically acquires which set of the plurality of sets of preset collision resolution PUCCH resources to be used for transmitting the plurality of colliding CSIs by detecting the DCI Format 3 or the DCI Format 3A.

EXAMPLE 4

A base station triggers a terminal to feed back a plurality of colliding CSIs through a PUSCH on colliding subframes through a 1-bit triggering signaling in a Format 0 of a common search space, and the plurality of colliding CSIs or part of the colliding CSIs are sent on the PUSCH.

The terminal feeds back the plurality of colliding CSIs through the PUSCH resources on the colliding subframes through the 1-bit triggering signaling in the Format 0 of the common search space, and all or part of the colliding CSIs are sent on the PUSCH.

EXAMPLE 5

On the colliding subframes, a base station triggers an uplink allocation without a TB enabled, and the plurality of colliding CSIs are sent on the PUSCH.

On the colliding subframes, a terminal detects an uplink allocation PUSCH resource without a TB enabled in the DCI, and the plurality of colliding CSIs are sent on the PUSCH.

EXAMPLE 6

A bases station configures a terminal to adopt different feedback formats respectively on non-colliding subframes and colliding subframes.

The terminal adopts different feedback formats respectively on the non-colliding subframes and the colliding subframes.

For example, if a collision between a plurality of CSIs occurs on a subframe 0 every other 20 radio frames, a feedback Format 3 is used on these colliding subframes, otherwise a feedback format 2 or a format 2a or a format 2b is used.

EXAMPLE 7

A base station configures a terminal to adopt different feedback formats in different subframe clusters through a terminal dedicated high layer signaling. For example, it is configured that CSI or CSI and HARQ information is fed back according to the format 2 or the format 2a or the format 2b in a subframe cluster 0, and the CSI or the CSI and HARQ information is fed back according to the format 3 in a subframe cluster 1.

The terminal adopts different configured feedback formats in different subframe clusters by receiving the terminal dedicated high layer signaling with respect to the sides. The CSI or the CSI and HARQ information is fed back according to the format 2 or the format 2a or the format 2b in the subframe cluster 0, and the CSI or the CSI and HARQ information is fed back according to the format 3 in the subframe cluster 1.

EXAMPLE 8

A base station configures or pre-configures that a priority of the terminal feedback type format 3 is higher than a priority of the format 2 or the format 2a or the format 2b, and when a CSI of the format 3 collides with a CSI of the format 2 or the format 2a or the format 2b, the CSI of the format 2 or the format 2a or the format 2b is preferentially discarded.

The priority of the terminal feedback type format 3 is higher than the priority of the format 2 or the format 2a or the format 2b, and when the CSI of the format 3 collides with the CSI of the format 2 or the format 2a or the format 2b, the CSI of the format 2 or the format 2a or the format 2b is preferentially discarded.

EXAMPLE 9

A base station pre-configures the terminal PUSCH resources to be used for transmitting a plurality of colliding CSIs through a terminal dedicated high layer signaling, and indicates the terminal to feed back all or part of the colliding CSIs through the pre-configured PUSCH resources on the colliding subframes.

The terminal obtains the PUSCH resources used for transmitting a plurality of colliding CSIs by receiving the terminal dedicated high layer signaling in advance, and the terminal feeds back all or part of the colliding CSIs through the PUSCH resources pre-configured through the terminal dedicated high layer signaling on the colliding subframes.

EXAMPLE 10

A base station pre-configures PUSCH resources used for transmitting a plurality of colliding CSIs to a terminal through a terminal dedicated high layer signaling, and on colliding subframes without aperiodic triggered feedback and colliding subframes without PUSCH transmission, indicates the terminal to feed back all or part of the colliding CSIs through the pre-configured PUSCH resources on the colliding subframes. If the aperiodic triggered feedback and the PUSCH transmission exist on the colliding subframes, aperiodic triggered CSIs or a plurality of colliding CSIs or CSIs with a highest priority are transmitted according to aperiodic triggering and PUSCH transmission resources.

The terminal obtains the PUSCH resources used for transmitting a plurality of colliding CSIs in advance through the terminal dedicated high layer signaling, and on the colliding subframes without aperiodic triggered feedback and the colliding subframes without PUSCH transmission, the terminal feeds back all or part of the colliding CSIs through the PUSCH resources pre-configured through the terminal dedicated high layer signaling on the colliding subframes. If the aperiodic triggered feedback and the PUSCH transmission exist on the colliding subframes, the aperiodic triggered CSIs or a plurality of colliding CSIs or the CSIs with the highest priority are transmitted according to the aperiodic triggering and the PUSCH transmission resources.

EXAMPLE 11

If on subframes by which the terminal feeds back a plurality of CSIs or a plurality of subframes with CSI collision, the base station triggers a terminal PUSCH resource allocation and/or sends uplink data, all or part of the colliding CSIs or the plurality of CSIs or the CSIs with the highest priority are sent in the corresponding PUSCH resources.

If on subframes by which the terminal feeds back a plurality of CSIs or a plurality of subframes with CSI collision, it is to trigger a terminal PUSCH resource allocation and/or send uplink data, all or part of the colliding CSIs or the plurality of CSIs or the CSIs with the highest priority are sent in the corresponding PUSCH resources.

EXAMPLE 12

If on subframes by which the terminal feeds back a plurality of CSIs or a plurality of subframes with CSI collision, the base station triggers a terminal PUSCH resource allocation and/or sends uplink data, but no aperiodic feedback is triggered, a base station indicates the terminal to send all or part of the colliding CSIs or the plurality of CSIs or the CSIs with the highest priority in the corresponding PUSCH resources. Wherein, when part of CSIs in the colliding CSIs are sent, a priority of this part of CSIs is higher than a priority of the discarded CSIs.

If on subframes by which the terminal feeds back a plurality of CSIs, it is to trigger a terminal PUSCH resource allocation and/or send uplink data during the DCI detection, but no aperiodic feedback is triggered, all or part of the colliding CSIs or the CSIs with the highest priority are fed back in the corresponding PUSCH resources.

EXAMPLE 13

A base station pre-configures a plurality of sets of PUSCH resources used for transmitting a plurality of colliding CSIs for a terminal through a terminal dedicated high layer signaling, and indicates the terminal to feed back all or part of the colliding CSIs through the PUSCH resources on the colliding subframes. The base station indicates to the terminal which set of resources of the configured plurality of sets of PUSCH resources to be used for transmitting the colliding CSIs through the DCI Format 3/3A of a common control area.

The terminal obtains a plurality of sets of PUSCH resources used for transmitting a plurality of colliding CSIs by receiving the terminal dedicated high layer signaling in advance, and feeds back all or part of the colliding CSIs through one set of the plurality of sets of PUSCH resources on the colliding subframes. Which set of resources of the configured plurality of sets of PUSCH resources will be used for transmitting the colliding CSIs is acquired by detecting the DCI Format 3/3A of the common control area.

EXAMPLE 14

A base station pre-configures a plurality of sets of PUSCH resources used for transmitting a plurality of colliding CSIs for a terminal through a terminal dedicated high layer signaling, and on colliding subframes without aperiodic triggered feedback and colliding subframes without PUSCH transmission, indicates the terminal to feed back all or part of the colliding CSIs through the PUSCH resources on the colliding subframes. If the aperiodic triggered feedback and the PUSCH transmission exist on the colliding subframes, aperiodic triggered CSIs or all or part of the colliding CSIs or CSIs with a highest priority are transmitted according to aperiodic triggering and PUSCH transmission resources. The base station indicates to the terminal which set of resources of the configured plurality of sets of PUSCH resources to be used for transmitting the colliding CSIs through the DCI Format 3/3A of a common control area.

The terminal acquires a plurality of sets of PUSCH resources used for transmitting a plurality of colliding CSIs in advance through the terminal dedicated high layer signaling, and feeds back all or part of the colliding CSIs through the PUSCH resources on the colliding subframes without aperiodic triggered feedback and the colliding subframes without PUSCH transmission. If the aperiodic triggered feedback and the PUSCH transmission exist on the colliding subframes, the aperiodic triggered CSIs or all or part of the colliding CSIs or the CSIs with the highest priority are transmitted according to the aperiodic triggering and the PUSCH transmission resources. The terminal acquires which set of resources of the configured plurality of sets of PUSCH resources will be used for transmitting the colliding CSIs by detecting the DCI Format 3/3A of the common control area.

The example of the present document also provides a base station, which includes: a notification unit, configured to notify a terminal of transmission resources used for transmitting a plurality of channel state information CSIs or a plurality of colliding CSIs and/or of priorities between a plurality of CSIs or a plurality of colliding CSIs.

The example of the present document also provides a terminal, and the terminal includes a feedback unit, which is configured to acquire transmission resources used for transmitting a plurality of channel state information CSIs or a plurality of colliding CSIs and/or priorities between a plurality of CSIs or a plurality of colliding CSIs from a base station.

The specific functions of the base station and the terminal may refer to the method examples, which will not be repeated here.

The above description is only for the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

INDUSTRIAL APPLICABILITY

In the present document, the base station indicates the terminal on how to handle a feedback of the colliding CSIs when collision between the CSIs occurs during processes of feeding back a plurality of CSI via a high layer signaling or a preset rule, which enables the base station and the terminal to reach a uniform feedback mechanism, and guarantees a minimum possibility of discarding CSIs, thereby solving the problem of the impact on the CoMP performance due to discarding excessive CSIs.

What is claimed is:

1. A method for feeding back channel state information, comprising:
   a base station notifying a terminal of transmission resources used for transmitting a plurality of Channel State Information (CSIs) or a plurality of colliding CSIs or of priorities between a plurality of CSIs or a plurality of colliding CSIs,
   wherein, the base station notifies the terminal by at least one of the following ways:
   a terminal dedicated high layer signaling, a physical downlink control signaling and a preset rule,
   wherein, the step of a base station notifying a terminal of transmission resources used for transmitting colliding CSIs comprises:
   the base station configuring PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through the PUSCH resources; and if the aperiodic triggered feedback and the PUSCH transmission exist, transmit aperiodic triggered CSIs or all or part of the colliding CSIs or CSIs with a highest priority according to aperiodic triggering and PUSCH transmission resources,
   or,
   wherein, the step of a base station notifying a terminal of transmission resources used for transmitting colliding CSIs comprises:
   the base station configuring a plurality of sets of PUSCH resources used for transmitting colliding CSIs through the terminal dedicated high layer signaling, and indicating the terminal to:
   on subframes with CSI collision, if no aperiodic triggered feedback and no PUSCH transmission exist, feed back all or part of the colliding CSIs through one set of the plurality of sets of PUSCH resources; and when the aperiodic triggered feedback or the PUSCH transmission exist, transmit aperiodic triggered CSIs or all or part of the colliding CSIs or CSIs with the highest priority according to aperiodic triggering and PUSCH transmission resources.

2. The method according to claim 1, wherein, the step of transmitting the colliding CSIs in the collision resolution resource or one set of the plurality of sets of collision resolution resources according to the priorities comprises:
   if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs.

3. The method according to claim 1, further comprising:
   the base station indicating which set of the plurality of sets of collision resolution resources or which set of the plurality of sets of PUSCH resources to be used for transmitting the colliding CSIs in a Downlink Control Information (DCI) Format 3 or a DCI Format 3A.

4. The method according to claim 1, further comprising:
   the base station triggering the terminal to feed back a plurality of colliding CSIs through a PUSCH on the subframes with CSI collision through a 1-bit signaling in a Format 0 of a common search space,
   or,
   wherein, the method further comprises: when an uplink allocation without a transmitting block enabled is triggered on the subframes with CSI collision, the base station indicating the terminal to send the colliding CSIs on the PUSCH,
   or,
   wherein, the method further comprises: the base station configuring the terminal to feed back CSIs in different feedback formats on subframes without CSI collision and subframes with CSI collision,
      wherein, the base station configures the terminal to feed back the CSIs in a format 2 or a format 2a or a format 2b on the subframes without CSI collision, and to feed back the CSIs in the format 3 or other one or more kinds of feedback formats except the format 2 or the format 2a or the format 2b on the subframes with CSI collision,
   or,
   wherein, the method further comprises: the base station configuring the terminal to feed back the CSIs in different feedback formats in different subframe clusters through the terminal dedicated high layer signaling,
   or,
   the base station configures that a priority of a CSI of a first feedback format of the terminal is higher than a priority of a CSI of a second feedback format of the terminal, and indicates the terminal to, when the CSI of the first feedback format collides with the CSI of the second feedback format, preferentially discard the CSI of the second feedback format,
      wherein, the first feedback format is the format 3, and the second feedback format is the format 2 or the format 2a or the format 2b.

5. A method for feeding back channel state information, comprising:
   a terminal acquiring transmission resources used for transmitting a plurality of Channel State Information (CSIs) or a plurality of colliding CSIs or priorities between a plurality of CSIs or a plurality of colliding CSIs from a base station,
   wherein, the terminal acquires the transmission resources used for transmitting the colliding CSIs or the priorities between the plurality of colliding CSIs by at least one of the following ways:
   a terminal dedicated high layer signaling, a physical downlink control signaling and a preset rule,
   wherein, the step of a terminal acquiring transmission resources used for transmitting colliding CSIs comprises:
   the terminal acquiring PUSCH resources used for transmitting colliding CSIs and configured by the base station through the terminal dedicated high layer signaling; and
   on subframes with CSI collision, if no aperiodic triggered feedback and no PUSCH transmission exist, the terminal feeding back all or part of the colliding CSIs through the PUSCH resources; and if the aperiodic triggered feedback and the PUSCH transmission exist, the terminal transmitting aperiodic triggered CSIs or all or part of the colliding CSIs or CSIs with a highest priority according to aperiodic triggering and PUSCH transmission resources.

6. The method according to claim 5, wherein, the step of a terminal acquiring transmission resources used for transmitting colliding CSIS comprises:

the terminal acquiring a plurality of sets of collision resolution resources used for transmitting the colliding CSIs and configured by the base station for the terminal through the terminal dedicated high layer signaling, wherein, a set of collision resolution resources include collision resolution resources of one or more colliding CSIs; and if the plurality of CSIs have a collision in one collision resolution resource, the terminal transmitting the colliding CSIs in one set of the plurality of sets of collision resolution resources according to the priorities, wherein, the step of the terminal transmitting the colliding CSIs in the collision resolution resource or one of the plurality of sets of collision resolution resources according to the priorities comprises:

if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs, or, wherein, the step of a terminal acquiring transmission resources used for transmitting colliding CSIs comprises:

the terminal acquiring Physical Uplink Shared Channel (PUSCH) resources used for transmitting colliding CSIs and configured by the base station for the terminal through the terminal dedicated high layer signaling; and the terminal feeding back all or part of the colliding CSIs through the PUSCH resources on subframes with CSI collision, or, wherein, the step of a terminal acquiring transmission resources used for transmitting colliding CSIs comprises:

the terminal acquiring a plurality of sets of PUSCH resources used for transmitting colliding CSIs and configured by the base station through the terminal dedicated high layer signaling; and the terminal feeding back all or part of the colliding CSIs through one set of the plurality of sets of PUSCH resources on subframes with CSI collision, wherein, the method further comprises: the terminal acquiring which set of the plurality of sets of collision resolution resources or which set of the plurality of sets of PUSCH resources to be used for transmitting the colliding CSIs in a Downlink Control Information (DCI) Format 3 or a DCI Format 3A, or, wherein, the step of a terminal acquiring transmission resources used for transmitting colliding CSIs comprises:

the terminal acquiring a plurality of sets of PUSCH resources used for transmitting colliding CSIs and configured by the base station through the terminal dedicated high layer signaling; and on subframes with CSI collision, if no aperiodic triggered feedback and no PUSCH transmission exist, the terminal feeding back all or part of the colliding CSIs through one set of the plurality of sets of PUSCH resources; and when the aperiodic triggered feedback or the PUSCH transmission exist, the terminal transmitting aperiodic triggered CSIs or all or part of the colliding CSIs or CSIs with the highest priority according to aperiodic triggering or PUSCH transmission resources, wherein, the method further comprises: the terminal acquiring which set of the plurality of sets of collision resolution resources or which set of the plurality of sets of PUSCH resources to be used for transmitting the colliding CSIs in a Downlink Control Information (DCI) Format 3 or a DCI Format 3A, or, wherein, the step of a terminal acquiring transmission resources used for transmitting colliding CSIs comprises:

on subframes by which the terminal feeds back a plurality of CSIs or a plurality of subframes with CSI collision, when the base station triggers a terminal PUSCH resource allocation or sends uplink data, the terminal sending the plurality of CSIs or part or all of the colliding CSIs or the CSIs with the highest priority in the allocated PUSCH resources, or, wherein, the step of a terminal acquiring transmission resources used for transmitting colliding CSIs comprises:

on subframes by which the terminal feeds back a plurality of CSIs or a plurality of subframes with CSI collision, when the base station triggers a terminal PUSCH resource allocation or sends uplink data, and no aperiodic feedback is triggered, the terminal sending the plurality of CSIs or all or part of the colliding CSIs or the CSIs with the highest priority in the allocated PUSCH resources.

7. The method according to claim 5, further comprising: when a 1-bit triggering signaling in a Format 0 of a common search space is received, the terminal feeding back a plurality of colliding CSIs through a PUSCH on the subframes with CSI collision, or, wherein, the method further comprises: on the subframes with CSI collision, when the terminal detects an uplink allocation PUSCH resource without a transmitting block enabled in downlink control information, the terminal sending the colliding CSIs on the PUSCH, or, wherein, the method further comprises: the terminal feeding back CSIs in different feedback formats on subframes without CSI collision and subframes with CSI collision, wherein, the terminal feeds back the CSIs in a format 2 or a format 2a or a format 2b on the subframes without CSI collision, and feeds back the CSIs in the format 3 or other one or more kinds of feedback formats except the format 2 or the format 2a or the format 2b on the subframes with CSI collision, or, wherein, the terminal receives the terminal dedicated high layer signaling, and feeds back the CSIs in different feedback formats in different subframe clusters according to the terminal dedicated high layer signaling, or, the method further comprises: when a CSI of a first feedback format collides with a CSI of a second feedback format, the terminal preferentially discarding the CSI of the second feedback format, wherein, the first feedback format is the format 3, and the second feedback format is the format 2 or the format 2a or the format 2b.

8. A base station, comprising a processor and a storage device, wherein the storage device stores processor-executable instructions that, when executed by the processor, cause the processor to perform steps in the following units:

a notification unit, configured to: notify a terminal of transmission resources used for transmitting a plurality of Channel State Information (CSIs) or a plurality of colliding CSIs or of priorities between a plurality of CSIs or a plurality of colliding CSIs, wherein, the notification unit notifies the terminal by at least one of the following ways:

a terminal dedicated high layer signaling, a physical downlink control signaling and a preset rule, wherein, the notification unit notifies the terminal of the transmission resources used for transmitting the colliding CSIs by the following way:

the notification unit configuring PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through the PUSCH resources; and if the aperiodic triggered feedback and the PUSCH transmission exist, transmit aperiodic triggered CSIs or all or part of the colliding CSIs or CSIs with a highest priority according to aperiodic triggering and PUSCH transmission resources, or, wherein, the notification unit notifies the terminal of the transmission resources used for transmitting the colliding CSIs by the following way:

the notification unit configuring a plurality of sets of PUSCH resources used for transmitting colliding CSIs through the terminal dedicated high layer signaling, and indicating the terminal to: on subframes with CSI collision, if no aperiodic triggered feedback and no PUSCH transmission exist, feed back all or part of the colliding CSIs through one set of the plurality of sets of PUSCH resources; and when the aperiodic triggered feedback or the PUSCH transmission exist, transmit aperiodic triggered CSIs or all or part of the colliding CSIs or CSIs with the highest priority according to aperiodic triggering and PUSCH transmission resources.

9. The base station according to claim 8, wherein, the colliding CSIs is transmitted in the collision resolution resource or one set of the plurality of sets of collision resolution resources according to the priorities by the following way:

if a number of the collision resolution resources or a number of the collision resolution resources used for transmitting the plurality of CSIs is less than a number of the colliding CSIs, discarding part of CSIs, wherein a priority of a CSI that is discarded is lower than a priority of a CSI that is not discarded; and if the number of the collision resolution resources or the number of the collision resolution resources used for transmitting the plurality of CSIs is greater than the number of the colliding CSIs, only occupying collision resolution resources corresponding to the colliding CSIs.

10. The base station according to claim 8, wherein, the notification unit is further configured to: indicate which set of the plurality of sets of collision resolution resources or which set of the plurality of sets of PUSCH resources to be used for transmitting the colliding CSIs in a Downlink Control Information (DCI) Format 3 or a DCI Format 3A.

11. The base station according to claim 8, wherein, the notification unit is further configured to: trigger the terminal to feed back a plurality of colliding CSIs through a PUSCH on the subframes with CSI collision through a 1-bit signaling in a Format 0 of a common search space, or, wherein, the notification unit is further configured to: when an uplink allocation without a transmitting block enabled is triggered on the subframes with CSI collision, indicate the terminal to send the colliding CSIs on the PUSCH, or, wherein, the notification unit is further configured to: configure the terminal to feed back CSIs in different feedback formats on subframes without CSI collision and subframes with CSI collision, wherein, the notification unit is further configured to: configure the terminal to feed back the CSIs in a format 2 or a format 2a or a format 2b on the subframes without CSI collision, and to feed back the CSIs in the format 3 or other one or more kinds of feedback formats except the format 2 or the format 2a or the format 2b on the subframes with CSI collision, or, wherein, the notification unit is further configured to: configure the terminal to feed back the CSIs in different feedback formats in different subframe clusters through the terminal dedicated high layer signaling, or, wherein, the notification unit is further configured to: configure that a priority of a CSI of a first feedback format of the terminal is higher than a priority of a CSI of a second feedback format of the terminal, and when the CSI of the first feedback format collides with the CSI of the second feedback format, indicate the terminal to preferentially discard the CSI of the second feedback format, wherein, the first feedback format is the format 3, and the second feedback format is the format 2 or the format 2a or the format 2b.

12. A terminal, comprising a processor and a storage device, wherein the storage device stores processor-executable instructions that, when executed by the processor, cause the processor to perform steps in the following units:

a feedback unit, configured to: acquire transmission resources used for transmitting a plurality of Channel State Information (CSIs) or a plurality of colliding CSIs or priorities between a plurality of CSIs or a plurality of colliding CSIs from a base station, wherein, the feedback unit acquires the transmission resources used for transmitting the colliding CSIs or the priorities between the a plurality of colliding CSIs by at least one of the following ways:
a terminal dedicated high layer signaling, a physical downlink control signaling and a preset rule,
wherein, the feedback unit acquires the transmission resources used for transmitting the colliding CSIs by the following way:
acquiring PUSCH resources used for transmitting colliding CSIs and configured by the base station through the terminal dedicated high layer signaling; and
on subframes with CSI collision, if no aperiodic triggered feedback and no PUSCH transmission exist, feeding back all or part of the colliding CSIs through the PUSCH resources; and if the aperiodic triggered feedback and the PUSCH transmission exist, transmitting aperiodic triggered CSIs or all or part of the colliding CSIs or CSIs with a highest priority according to aperiodic triggering and PUSCH transmission resources,
or,
wherein, the feedback unit acquires the transmission resources used for transmitting the colliding CSIs by the following way:
acquiring a plurality of sets of PUSCH resources used for transmitting colliding CSIs and configured by the base station through the terminal dedicated high layer signaling; and
on subframes with CSI collision, if no aperiodic triggered feedback and no PUSCH transmission exist, feeding back all or part of the colliding CSIs through one set of the plurality of sets of PUSCH resources; and when the aperiodic triggered feedback or the PUSCH transmission exist, transmitting aperiodic triggered CSIs or all or part of the colliding CSIs or CSIs with the highest priority according to aperiodic triggering and PUSCH transmission resources.

13. The terminal according to claim 12, wherein, the feedback unit is further configured to: on subframes by which the terminal feeds back a plurality of CSIs or a plurality of subframes with CSI collision, when the base station triggers a terminal PUSCH resource allocation or sends uplink data, send the plurality of CSIs or part or all of the colliding CSIs or the CSIs with the highest priority in the allocated PUSCH resources,
or,
wherein,
the feedback unit is further configured to: on subframes by which the terminal feeds back a plurality of CSIs or a plurality of subframes with CSI collision, when the base station triggers a terminal PUSCH resource allocation or sends uplink data, and no aperiodic feedback is triggered, send the plurality of CSIs or all or part of the colliding CSIs or the CSIs with the highest priority in the allocated PUSCH resources,
or,
wherein, the feedback unit is further configured to: when a 1-bit triggering signaling in a Format 0 of a common search space is received, feed back a plurality of colliding CSIs through a PUSCH on the subframes with CSI collision,
or,
wherein, the feedback unit is further configured to: on the subframes with CSI collision, when an uplink allocation PUSCH resource without a transmitting block enabled in downlink control information is detected, send the colliding CSIs on the PUSCH,
or,
wherein, the feedback unit is further configured to: feed back the CSIs in different feedback formats on subframes without CSI collision and subframes with CSI collision,
or,
wherein, the feedback unit is further configured to: feed back the CSIs in a format 2 or a format 2a or a format 2b on the subframes without CSI collision, and feed back the CSIs in the format 3 or other one or more kinds of feedback formats except the format 2 or the format 2a or the format 2b on the subframes with CSI collision,
or,
wherein, the feedback unit is further configured to: receive the terminal dedicated high layer signaling, and feed back the CSIs in different feedback formats in different subframe clusters according to the terminal dedicated high layer signaling,
or,
wherein, the feedback unit is further configured to:
when a CSI of a first feedback format collides with a CSI of a second feedback format, preferentially discard the CSI of the second feedback format,
wherein, the first feedback format is the format 3, and the second feedback format is the format 2 or the format 2a or the format 2b.

* * * * *